(12) United States Patent
Meier et al.

(10) Patent No.: US 11,220,986 B2
(45) Date of Patent: Jan. 11, 2022

(54) METHOD AND CONTROL DEVICE FOR OPERATING A COMMON-RAIL FUEL SUPPLY SYSTEM

(71) Applicant: MAN Energy Solutions SE, Augsburg (DE)

(72) Inventors: Christian Meier, Augsburg (DE); Marcus Seibt, Fischach/Willmatshofen (DE)

(73) Assignee: MAN Energy Solutions SE, Augsburg (DE)

( * ) Notice: Subject to any disclaimer, the term of this patent is extended or adjusted under 35 U.S.C. 154(b) by 20 days.

(21) Appl. No.: 15/931,319

(22) Filed: May 13, 2020

(65) Prior Publication Data

US 2020/0362804 A1 Nov. 19, 2020

(30) Foreign Application Priority Data

May 15, 2019 (DE) ...................... 10 2019 112 754.8

(51) Int. Cl.
*F02M 55/02* (2006.01)
*F02D 19/06* (2006.01)
(Continued)

(52) U.S. Cl.
CPC ............. *F02M 55/025* (2013.01); *F02B 3/06* (2013.01); *F02D 19/0621* (2013.01); *F02D 19/0657* (2013.01); *F02D 19/0684* (2013.01); *F02M 37/0064* (2013.01); *F02M 45/04* (2013.01); *F02M 59/44* (2013.01);
(Continued)

(58) Field of Classification Search
CPC .... F02B 3/06; F02D 19/0621; F02D 19/0657; F02D 19/0684; F02D 2041/1409; F02D 2041/141; F02D 2041/1422; F02D 2200/0602; F02D 2200/101; F02D 41/3845; F02F 2007/0097; F02M 2200/18; F02M 2200/315; F02M 2200/40; F02M 37/0064; F02M 45/04; F02M 55/025; F02M 59/44;
(Continued)

(56) References Cited

U.S. PATENT DOCUMENTS 6,012,438 A * 1/2000 Joos ..................... F02D 41/1454
                                                          123/198 D
6,712,044 B1 * 3/2004 Rembold ............... F02M 37/04
                                                          123/179.17

(Continued)

*Primary Examiner* — Carl C Staubach
(74) *Attorney, Agent, or Firm* — Cozen O'Connor

(57) ABSTRACT

A method for operating a common-rail fuel supply system of an internal combustion engine includes determining, dependent on an operating point of the engine, a set point rate of delivery of the high-pressure pumping device, and a set point pressure for the pressure storage system under high pressure, determining, dependent on a deviation between the set point pressure and an actual pressure in the pressure storage system, for a first part quantity of the throttle valves a closed-loop control portion for the position of the respective throttle valve, and activating the first part quantity of the throttle valves with the closed-loop control portion in addition to open-loop control for only the respective throttle valve of the first part quantity of the throttle valves. The, or each, throttle valve of a second part quantity of the throttle valves is exclusively activated with the open-loop control portion.

8 Claims, 2 Drawing Sheets

(51) Int. Cl.
*F02M 37/00* (2006.01)
*F02M 45/04* (2006.01)
*F02M 59/44* (2006.01)
*F02M 63/00* (2006.01)
*F02M 63/02* (2006.01)
*F02B 3/06* (2006.01)
*F02F 7/00* (2006.01)

(52) U.S. Cl.
CPC .... *F02M 63/0005* (2013.01); *F02M 63/0215* (2013.01); *F02M 63/0225* (2013.01); *F02F 2007/0097* (2013.01); *F02M 2200/18* (2013.01); *F02M 2200/315* (2013.01); *F02M 2200/40* (2013.01)

(58) Field of Classification Search
CPC ........... F02M 63/0005; F02M 63/0215; F02M 63/0225

See application file for complete search history.

(56) References Cited

U.S. PATENT DOCUMENTS

| | | | | |
|---|---|---|---|---|
| 8,528,522 | B2* | 9/2013 | Li | F02M 59/366 123/456 |
| 2005/0204727 | A1* | 9/2005 | Lewis | F01L 9/20 60/285 |
| 2007/0062188 | A1* | 3/2007 | Fry | F02B 37/18 60/599 |
| 2009/0030589 | A1* | 1/2009 | Irisawa | F02D 41/0007 701/103 |
| 2009/0223488 | A1* | 9/2009 | Dolker | F02D 41/3845 123/456 |
| 2012/0215424 | A1* | 8/2012 | Dolker | F02D 41/3863 701/104 |
| 2012/0226428 | A1* | 9/2012 | Dolker | F02D 41/222 701/103 |
| 2013/0206109 | A1* | 8/2013 | Dolker | F02D 41/20 123/456 |
| 2013/0206111 | A1* | 8/2013 | Riepl | F02M 59/447 123/478 |
| 2016/0305312 | A1* | 10/2016 | Ismail | F02D 41/2464 |
| 2017/0204803 | A1* | 7/2017 | Pursifull | F02D 41/123 |
| 2018/0058348 | A1* | 3/2018 | Berkemeier | F02D 19/08 |
| 2018/0320639 | A1* | 11/2018 | Bartelt | F02D 41/3845 |

* cited by examiner

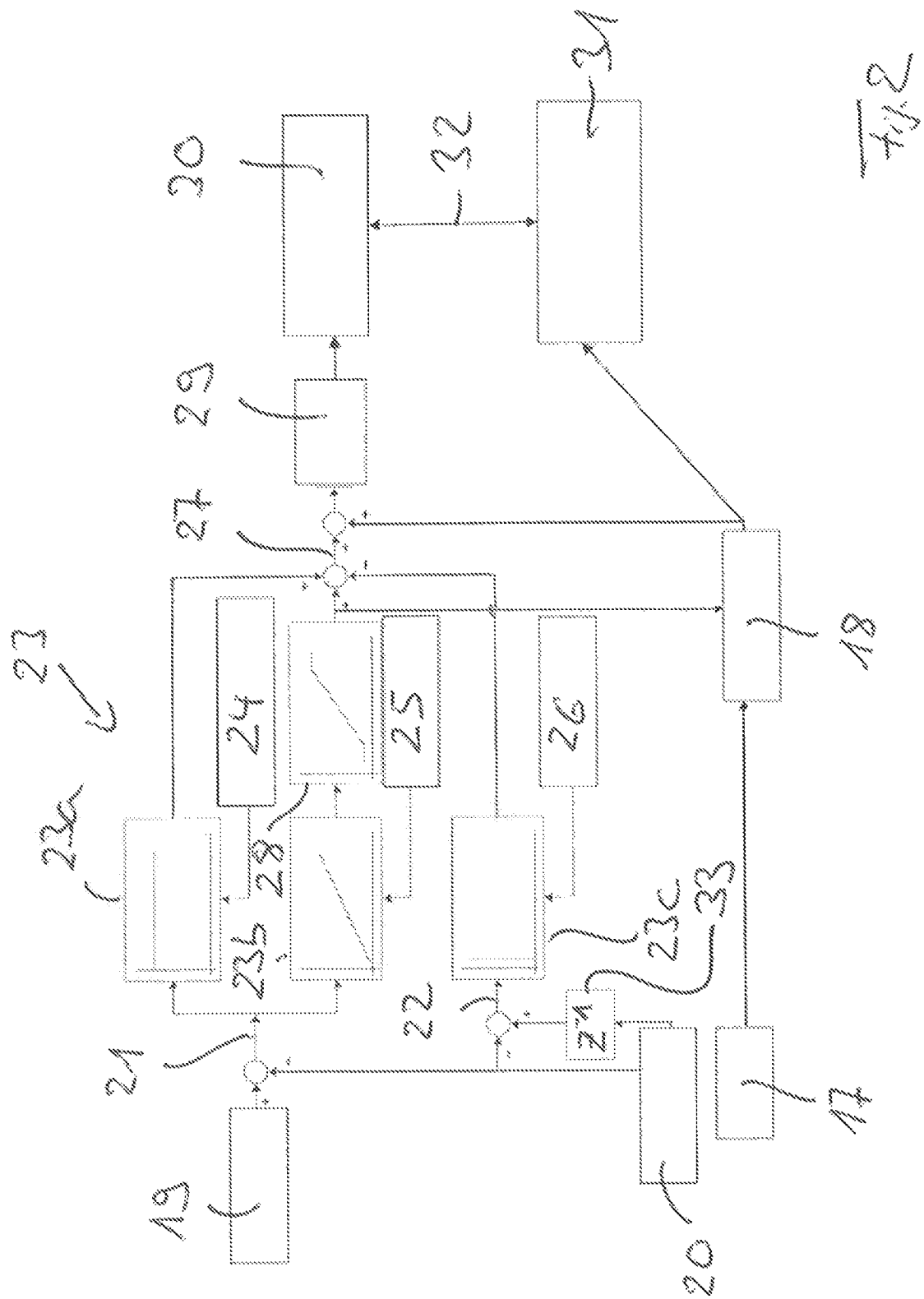

METHOD AND CONTROL DEVICE FOR OPERATING A COMMON-RAIL FUEL SUPPLY SYSTEM

BACKGROUND OF THE INVENTION

1. Field of the Invention

The invention relates to a method and to a control device for operating a common-rail fuel supply system.

2. Description of the Related Art

FIG. 1 shows the fundamental construction of a common-rail fuel supply system of an internal combustion engine known from the prior art, namely of a diesel internal combustion engine for a ship operated with heavy fuel oil. This construction is known from DE 101 57 135 B4. The common-rail fuel supply system of FIG. 1 comprises, for each cylinder, at least one injector 1. By way of the injectors 1, fuel is injectable into each of the cylinders of the internal combustion engine. The common-rail fuel supply system, furthermore, comprises a high-pressure pumping device 3 comprising at least one low-pressure pump 5, multiple high-pressure pumps 2 and a high-pressure pump storage unit 8, in order to deliver fuel from a low-pressure region 4 of the common-rail fuel supply system into a high-pressure region 6 of the same, wherein in the high-pressure region 6 between the high-pressure pumping device 3 and the injectors 1 a pressure storage system 7 that is permanently under high pressure is provided. The pressure storage system 7 that is permanently under high pressure, which is also referred to as common-rail, comprises multiple distributor units 9. The distributor units 9 are connected to the high-pressure pumping device 3 and among themselves via high-pressure lines 10 that are permanently under high pressure. The pressure storage system 7, namely the distributor units 9, are, furthermore, connected to the injectors 1 via high-pressure lines 11 that are under high pressure dependent on the injection cycle. The high-pressure lines 11 that are under high pressure at times depending on the injection cycle, which connect the injectors 1 to the distributor units 9, are assigned switching valves 12, which feed fuel to the injectors dependent on the injection cycle.

FIG. 1, furthermore, shows throttle valves 13 which are arranged before the high-pressure pumps 2 of the high-pressure pumping device 3. By way of the throttle valves 13, the rate of delivery of the high-pressure pumps 2 and thus of the high-pressure pumping device 3 can be adjusted. FIG. 1, furthermore, shows a purge valve 14 and a safety valve 15. It is pointed out that in contrast with the construction of the common-rail fuel supply system shown in FIG. 1, the fuel can also be pumped from the high-pressure fuel pumps 2 directly, i.e., without pump storage unit 8 connected in between, into the pressure storage system 7, which comprises the multiple distributor units 9.

As already explained, the rate of delivery of the high-pressure pumps 2 can be adjusted with the help of the throttle valves 13. According to the practice, all throttle valves 13 are operated by closed-loop control. As a consequence of the closed-loop control of all throttle valves 13, the position of the throttle valves 13 changes continuously during the operation. In the process, the throttle valves 13 are subjected to wear. This limits the lifespan of the throttle valves 13.

SUMMARY OF THE INVENTION

Starting out from this, the present invention is based on an object of creating a new type of method for operating a common-rail fuel supply system with the help of which the lifespan of the throttle valves can be increased.

This object may be achieved through a method for operating a common-rail fuel supply system of an internal combustion engine.

According to an aspect of the invention, a set point rate of delivery of the high-pressure pumping device on the one hand and a set point pressure of the pressure storage system under high pressure on the other hand are determined dependent on a requested operating point of the internal combustion engine.

Dependent on the set point rate of delivery of the high-pressure pumping device, an open-loop control portion for the position of the respective throttle valve, with which the respective throttle valve is activated, is determined for all throttle valves.

Dependent on a deviation between the set point pressure and an actual pressure in the pressure storage system under high pressure, a closed-loop control portion for the position of the respective throttle valve is determined for a first part quantity of the throttle valves, with which in addition to the open-loop control merely the respective throttle valve of the first part quantity of the throttle valves is activated subject to providing a variable position of the respective throttle valve, whereas the or each throttle valve of a second part quantity of the throttle valves is exclusively activated with the open-loop control portion subject to providing a non-variable position of the respective throttle valve.

It is therefore in the interest of the present invention to operate only a first part quantity of the throttle valves in the respective operating point by closed-loop control, but activate the other throttle valves of the second part quantity with an open-loop control portion that is fixed for the respective operating point. In this manner, the lifespan of the throttle valves can be increased, in particular when the, or each, throttle valve of the part quantity of the throttle valves, which are operated in the respective operating point by closed-loop control, is changed or replaced over the operating duration of the internal combustion engine, i.e., exchanged for a respective throttle valve of the second part quantity.

According to an advantageous further development of the invention, the first part quantity of the throttle valves, which are activated with the open-loop control portion and the closed-loop control portion, comprises a single throttle valve for each cylinder bank. By way of this, the lifespan of the throttle valves can be particularly advantageously increased.

According to an advantageous further development of the invention, the or each, throttle valve of the first part quantity of the throttle valves which are activated with the open-loop control portion and the closed-loop control portion are changed or replaced in a time-controlled and/or event-controlled manner. This also serves for the advantageous increase of the lifespan of the throttle valves.

BRIEF DESCRIPTION OF THE DRAWINGS

Preferred further developments of the invention are obtained from the following description. Exemplary embodiments of the invention are explained in more detail by way of the drawings without being restricted to this. There it shows:

FIG. 2: is a block diagram for illustrating the method for operating a common-rail fuel supply system.

DETAILED DESCRIPTION OF THE PRESENTLY PREFERRED EMBODIMENTS

Figure 1:
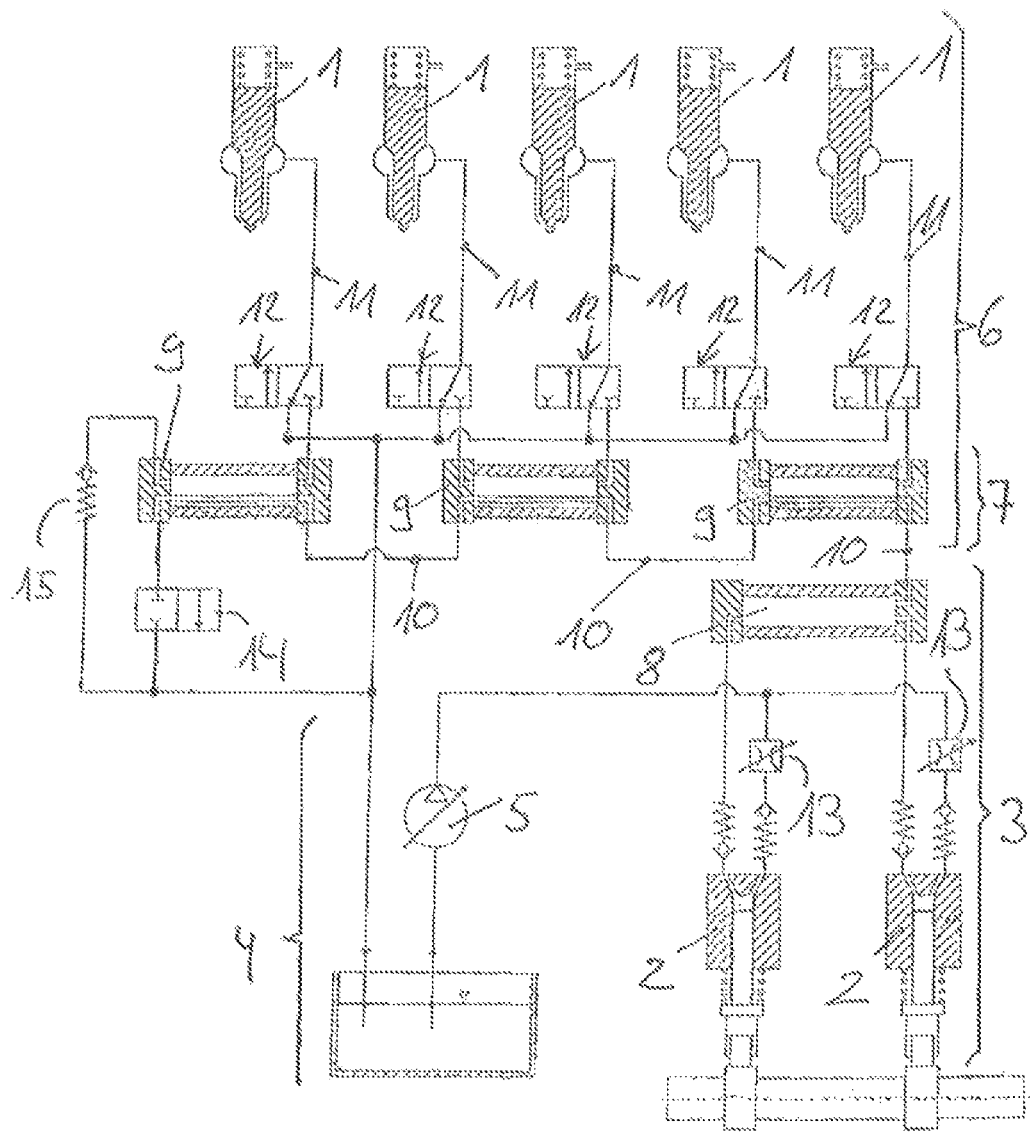
FIG. 1: is a diagram of a fuel supply system known from the prior art.

The invention relates to a method and to a control device for operating a common-rail fuel supply system of an internal combustion engine configured in particular as a large diesel internal combustion engine or diesel internal combustion engine of a ship. The fundamental construction of a common-rail fuel supply system is familiar to the person skilled in the art addressed here and has already been described making reference to FIG. 1. The present invention relates to a method and to a control device for operating a common-rail fuel supply system which make it possible to prolong the lifespan of the throttle valves 13, which serve for the open-loop control and/or closed-loop control of the fuel rate of delivery of the high-pressure pumps 2.

Dependent on a requested operating point of the internal combustion engine, in particular dependent on a requested load of the internal combustion engine, a set point rate of delivery of the high-pressure pumping device 3 on the one hand and a set point pressure for the pressure storage system 7 under high pressure on the other hand are determined.

Dependent on the set point rate of delivery of the high-pressure pumping device 3, a control portion for the position of the respective throttle valve 13 is determined for all throttle valves 13 or for each throttle valve 13, with which each throttle valve 13 is activated in the sense of a pilot control.

Dependent on a deviation between the set point pressure and an actual pressure in the pressure storage system 7 under high pressure, a closed-loop control portion for the position of the respective throttle valve 13 is determined in addition to open-loop control, which is referred to as first part quantity, with which in addition to open-loop control merely the respective throttle valve 13 of the first part quantity of the throttle valves 13 is activated subject to providing a position of the respective throttle valve that is variable in the respective operating point. The closed-loop control portion is also referred to as closed-loop controller portion. For the throttle valves 13 of the first part quantity of the throttle valves 13 open-loop control provides a so-called pilot control portion. The, or each, remaining throttle valve 13, i.e., the, or each, throttle valve of a second part quantity of the throttle valves 13, is exclusively activated with the open-loop control portion subject to providing a position of the respective throttle valve 13 that is non-variable in the respective operating point.

Making reference to FIG. 1, a control portion each is thus determined for both throttle valves 13 in the respective operating point but only for one of these throttle valves 13 is a closed-loop control portion additionally determined in the respective operating point, which is superimposed on open-loop control.

Dependent on the requested operating point, the position of the throttle valve 13 activated only with the open-loop control portion is then not variable but rather constant. Only the other throttle valve 13 is operated by closed-loop control in the respective operating point in order to adapt the actual pressure in the pressure storage system 7 to the set point pressure.

Further details are described in the following making reference to FIG. 2. FIG. 2 shows a block diagram of a control and closed-loop control structure for operating the common-rail fuel supply system, namely the throttle valves 13 of the same.

In a block 17, a set point rate of delivery of the high-pressure pumping device 3 is determined dependent on a requested operating point of the internal combustion engine, wherein in a block 18 dependent on this set point rate of delivery of the high-pressure pumping device 3 for each throttle valve 13 a control portion for the position of the respective throttle valve 13 is determined.

Dependent on the requested operating point of the internal combustion engine, the set point pressure for the pressure storage system 7 under high pressure is determined in a block 19. In a block 20, the actual pressure of the pressure storage system 7 is determined, preferentially with the help of at least one pressure sensor.

Dependent on the set point pressure of the block 19 and the actual pressure of the block 20, closed-loop control deviations 21, 22 are determined, which are fed to a closed-loop controller 23 as input variable. The closed-loop control deviation 21 is a closed-loop control deviation between the set point pressure of the block 19 and the non-delayed actual pressure of the block 20. The closed-loop control deviation 22 is a closed-loop control deviation between the set point pressure of the block 19 and the time-delayed actual pressure of the block 20 in the block 33.

In the shown exemplary embodiment of FIG. 2, the closed-loop controller comprises a P-portion 23a, an I-portion 23b and a D-portion 23c. The proportional constant for the P-portion 23a of the closed-loop controller 23 is determined in a block 24 dependent on the rotational speed of the internal combustion engine and/or dependent on the load of the internal combustion engine and/or dependent on the closed-loop control deviation 21. In a block 25, the I-constant for the I-portion 23b of the closed-loop controller 23 is likewise determined dependent on the rotational speed of the internal combustion engine and/or dependent on the load of the internal combustion engine and/or dependent on the closed-loop control deviation 21. In the block 26, the D-constant for the D-portion 23c of the closed-loop controller 23 is determined dependent on the rotational speed of the internal combustion engine and/or the load of the internal combustion engine.

Starting rates of the P-portion 23a, of the I-portion 23b and of the D-portion 23c of the closed-loop controller 23 are superimposed in order to provide a starting variable 27 of the closed-loop controller 23, wherein in the shown exemplary embodiment the output of the I-portion 23b is limited with a limiter 28.

As already explained, open-loop control portions of the block 18 for all throttle valves 13 are determined. Only for a first part quantity of the throttle valves 13 a closed-loop control portion for the position of the respective throttle valve 13 is determined however via the closed-loop controller 23, which is then superimposed with the open-loop control portion according to FIG. 2 to obtain a manipulated variable 29 for activating the respective throttle valve 13 of the first part quantity of the throttle valves. The, or each, remaining throttle valve 13 not belonging to the first part quantity of the throttle valves 13, i.e., a second part quantity of the throttle valves 13, is exclusively activated with the open-loop control portion of the block 18, so that accordingly during the operation of the internal combustion engine in the respective operating point on the, or each, throttle valve 13, which is activated with the open-loop control portion of the block 18 and the closed-loop control portion 27 of the closed-loop controller 23, a variable position of the respective throttle valve 13 materializes, whereas the position of the, or each, other throttle valve 13, which is exclusively activated with the open-loop control portion of the block 18, is invariable in the respective operating point.

In FIG. 2, a block 30 visualizes the first part quantity of the throttle valves which is activated both with the open-loop control portion of the block 18 and also with the closed-loop control portion 27 of the closed-loop controller 23. A block 31 visualizes the, or each, remaining throttle valve 13 or the second part quantity of the throttle valves, which is exclusively activated with the open-loop control portion of the block 18.

With the double arrow 32 of FIG. 2 it is visualized that the, or each, throttle valve of the first part quantity 30 of the throttle valves 13, which are activated with the open-loop control portion and the closed-loop control portion, are changed or replaced, in order to not always closed-loop control the same throttle valve 13 in its position but change the throttle valves 14 that are operated by closed-loop control. Here, a throttle valve 13 of the first part quantity 30 is then exchanged or replaced with a throttle valve 13 of the second part quantity 31.

The varying or changing the, or each, throttle valve 13 of the first part quantity 30, which is activated with the open-loop control portion and the closed-loop control portion, can be changed or replaced in a time-controlled and/or event-controlled manner.

In the case of a time-controlled changing or varying of the respective throttle valve 13, the changing or varying of the respective throttle valve 13 of the first part quantity 30 for a throttle valve 13 of the second part quantity 31 takes place after a defined period of time or operating duration of the internal combustion engine.

In the case of an event-controlled changing or varying of the respective throttle valve 13, the changing or varying of the respective throttle valve 13 of the first part quantity 30 for a throttle valve 13 of the second part quantity 31 takes place preferentially with every engine start of the internal combustion engine.

The invention, furthermore, relates to a control device for carrying out the method according to the invention. Dependent on a requested operating point of the internal combustion engine, the control device determines the set point rate of delivery of the high-pressure pumping device and the set point pressure for the pressure storage system 7.

Dependent on the set point rate of delivery of the high-pressure pumping device, the control device determines for each throttle valve a control portion for the position of the respective throttle valve, with which the control device activates each throttle valve 13.

Dependent on a deviation between the set point pressure and an actual pressure in the pressure storage system 7 under high pressure, the control device determines for a first part quantity of the throttle valves 13 a closed-loop control portion for the position of the respective throttle valve 13, with which the control device, in addition to the open-loop control portion, merely activates the respective throttle valve 13 of the first part quantity of the throttle valves 13 subject to providing a variable position of the respective throttle valve 13 in the respective operating point of the internal combustion engine, whereas the control device activates the or each throttle valve 13 of a second part quantity of the throttle valves 13 exclusively with the open-loop control portion subject to providing a non-variable position of the respective throttle valve 13 in the respective operating point of the internal combustion engine.

The invention makes it possible to operate throttle valves 13 of a common-rail fuel supply system with less wear in order to thereby increase the lifespan of the same.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE LIST

1 Injector
2 High-pressure pump
3 High-pressure pumping device
4 Low-pressure region
5 Low-pressure pump
6 High-pressure region
7 Pressure storage system
8 High-pressure pump storage unit
9 Distributor unit
10 High-pressure line
11 High-pressure line
12 Switching valve
13 Throttle valve
14 Purge valve
15 Safety valve
17 Block set point rate of delivery determination
18 Block control portion
19 Block set point pressure determination
20 Block actual pressure determination
21 Closed-loop control deviation
22 Closed-loop control deviation
23 Closed-loop controller
23a P-portion
23b I-portion
23c D-portion
24 Block P-closed-loop control constant determination
25 Block I-closed-loop control constant determination
26 Block D-closed-loop control constant determination
27 Closed-loop control portion
28 Limiter
29 Manipulated variable
30 First part quantity of the throttle valves
31 Second part quantity of the throttle valves
32 Variation change of the throttle valves

We claim:

1. A method for operating a common-rail fuel supply system of an internal combustion engine configured as a diesel internal combustion engine of a ship, the common-rail fuel supply system having a low-pressure region (4), a high-pressure region (6) and a high-pressure pumping device (3) having at least two high-pressure pumps (2), with the help of which fuel from the low-pressure region (4) of the fuel supply system is deliverable into the high-pressure region (6) of the fuel supply system, wherein in the high-pressure region (6) between the high-pressure pumping device (3) and injectors (1) assigned to cylinders, a pressure storage system (7) that is under high pressure is provided, and wherein a rate of delivery of the high-pressure pumping device (3) is adjustable by way of throttle valves (13) upstream of the high-pressure pumps (2), the method comprising:

determining, dependent on a requested operating point of the internal combustion engine, a set point rate of delivery of the high-pressure pumping device (3), and a set point pressure for the pressure storage system (7) under high pressure, determining, dependent on the set point rate of delivery of the high-pressure pumping device (3) for all throttle valves (13), a control portion for the position of the respective throttle valve (13), and activating the respective throttle valve (13) with the determined control portion, determining, dependent on a deviation between the set point pressure and an actual pressure in the pressure storage system (7) under high pressure, for a first part quantity of the throttle valves (13) a closed-loop control portion for the position of the respective throttle valve (13), and activating the first part quantity of the throttle valves (13) with the closed-loop control portion in addition to open-loop control for only the respective throttle valve (13) of the first part quantity of the throttle valves (13), whereas the, or each, throttle valve (13) of a second part quantity of the throttle valves (13) is exclusively activated with the open-loop control portion, and exchanging or replacing, the, or each, throttle valve (13) of the first part quantity of the throttle valves (13), with a throttle valve of the second part quantity of the throttle valves (13).

2. The method according to claim 1, wherein the first part quantity of the throttle valves (13), which are activated with the open-loop control portion and the closed-loop control portion, comprises a single throttle valve for each cylinder bank.

3. The method according to claim 2, wherein the exchanging or replacing is performed in a time-controlled manner.

4. The method according to claim 3, wherein the exchanging or replacing is performed after expiration of a defined period of time.

5. The method according to claim 1, wherein the exchanging or replacing is performed in an event-controlled manner.

6. The method according to claim 5, wherein the exchanging or replacing is performed during an engine start.

7. The method according to claim 1, further comprising determining the set point rate of delivery and the set point pressure dependent on a requested load of the internal combustion engine.

8. A common-rail fuel supply system of an internal combustion engine configured as a diesel internal combustion engine of a ship, comprises:
    a low-pressure region (4);
    a high-pressure region (6);
    a high-pressure pumping device (3) comprising at least two high-pressure pumps (2) configured to deliver fuel from the low-pressure region (4) of the fuel supply system into the high-pressure region (6);
    a pressure storage system (7) under high pressure arranged in the high-pressure region (6) between the high-pressure pumping device (3) and injectors (1) assigned to cylinders of the internal combustion engine;
    a plurality of throttle valves arranged upstream of the high-pressure pumps (2), and configured to adjust a rate of delivery of the high-pressure pumping device (3); and
    a controller,
    wherein the controller, dependent on a requested operating point of the internal combustion engine on the one hand, determines a set point rate of delivery of the high-pressure pumping device (3) and a set point pressure for the pressure storage system (7) under high pressure,
    wherein the controller, dependent on the set point rate of delivery of the high-pressure pumping device (3), determines a control portion for the position of the respective throttle valve (13) for each throttle valve (13), with which the controller activates each throttle valve (13),
    wherein the controller, dependent on a deviation between the set point pressure and an actual pressure in the pressure storage system (7) under high pressure, is configured to determine a closed-loop control portion for the position of the respective throttle valve (13) for a first part quantity of the throttle valves (13), with which the controller, in addition to open-loop control, activates the respective throttle valve (13) of the first part quantity of the throttle valves (13), whereas the controller activates the, or each, throttle valve (13) of a second part quantity of the throttle valves (13) exclusively with the open-loop control portion, and
    wherein the controller controls exchanging or replacing, of the, or each, throttle valve (13) of the first part quantity of the throttle valves (13), with a throttle valve of the second part quantity of the throttle valves (13).

* * * * *